Figure 1:
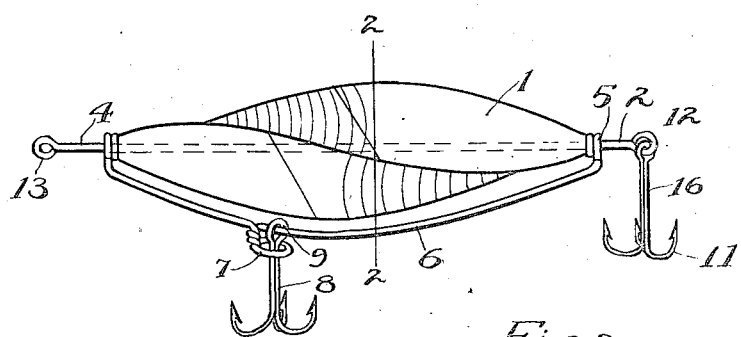

R. F. O'BRIEN.
ARTIFICIAL MINNOW.
APPLICATION FILED MAY 21, 1917.

1,256,155.

Patented Feb. 12, 1918.

Inventor:
Richard F. O'Brien
by C. D. Enochs
Attorney

UNITED STATES PATENT OFFICE.

RICHARD F. O'BRIEN, OF MINNEAPOLIS, MINNESOTA.

ARTIFICIAL MINNOW.

1,256,155.

Specification of Letters Patent.

Patented Feb. 12, 1918.

Application filed May 21, 1917. Serial No. 170,075.

*To all whom it may concern:*

Be it known that I, RICHARD F. O'BRIEN, a citizen of the United States, and a resident of Minneapolis, in the county of Hennepin and State of Minnesota, have invented certain new and useful Improvements in Artificial Minnows, of which the following is a specification.

One object of my invention is to provide a buoyant artificial minnow body of such style that it will rotate in a substantially horizontal plane when pulled through the water.

Another object of my invention is to combine with such a body, a means for suspending a hook below said body in such manner that the hook will have a certain freedom of movement but will be restrained from catching the turning body.

Another object of my invention is to provide with an artificial minnow body of the class described, hooks rigidly carried by the body.

Another object of my invention is to provide in a device of the class described, means for maintaining the body in a substantially horizontal position as it is drawn through the water, and also means for preventing the line from twisting as the body rotates.

With these and incidental objects, the invention consists of certain novel features of construction and combination of parts, the essential elements of which are hereinafter described with reference to the drawing which accompanies and forms a part of this specification.

Figure 2:
Figure 4:
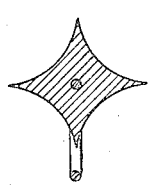
Figure 3:
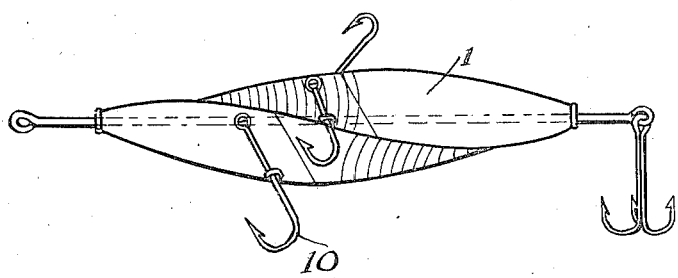

In the drawing Figure 1 is a side elevation of my preferred form of artificial minnow: Fig. 2 is a section of the body taken on the line 2—2, Fig. 1; Fig. 3 is a side elevation of the body with rigidly attached hooks carried thereby; and Fig. 4 is a sectional view of a similar body having four sides instead of three as shown in Figs. 1 to 3 inclusive.

A body 1, Fig. 1, having a partial twist running longitudinally thereof is rotatably carried on a stem 2, and the faces 3, Fig. 2, are slightly dished so that when the body is drawn through the water the action of water on the faces will rotate the body therein.

The body is preferably painted more than one color so as to attract fish by its apparent rapid changing of color.

Loosely suspended at the ends 4 and 5 of the stem 2 is a supporting member 6, in which is formed a loop 7, and a hook 8, which may be either of single or multiple type, hangs at 9 on the member 6, with the stem passing through the loop 7.

With this construction the hook has a considerable movement but is restrained by the loop 7 from swinging far enough to ever catch on the body 1.

The loop 7 may be positioned far enough away from the body so that hooks 10 rigidly attached to the body 1, Fig. 3, will clear the member 6, or when the hooks are mounted in this style, the hook 8 and the supporting member 6 may be entirely dispensed with.

A multiple hook 11 is linked at 12 to the rear end of the stem 2, and an eye 13 at the forward end of the stem 2 serves for attaching thereto a leader or line, no swivel being needed as there is no tendency for the artificial minnow to revolve as the hook 16 is of sufficient weight to prevent its revolution, and the body 1 only is rotated as the bait is drawn through the water.

While I have described my invention and illustrated it in several designs, I do not wish it understood that I limit myself to these constructions, as it is evident that the invention may be varied in many ways within the scope of the following claims.

Claims:

1. As an article of manufacture, an artificial minnow comprising a stem, an artificial body rotatably mounted on said stem, a supporting loop loosely hung from said stem, a hook suspended from said supporting loop, and means for limiting the motion of said hook with respect to said supporting loop.

2. As an article of manufacture, an artificial body rotatably mounted on a stem, a supporting loop loosely mounted on said stem and adapted to hang below said body, a hook supported by said supporting loop and having a loop formed therein through which the shank of said hook passes, and a hook hinged at the rear end of said stem.

RICHARD F. O'BRIEN.